(12) United States Patent
Carré et al.

(10) Patent No.: US 8,776,995 B2
(45) Date of Patent: Jul. 15, 2014

(54) TIGHTENER

(75) Inventors: Lionel Carré, Seeg (DE); Michael Lang, Halblech (DE); Johannes Muehlschlegel, Aitrach (DE); Michael Sdahl, Ottobeuren (DE)

(73) Assignee: Multivac Sepp Haggenmueller GmbH & Co. KG, Wolfertschwenden (DE)

( * ) Notice: Subject to any disclaimer, the term of this patent is extended or adjusted under 35 U.S.C. 154(b) by 318 days.

(21) Appl. No.: 13/208,629

(22) Filed: Aug. 12, 2011

(65) Prior Publication Data
US 2013/0037391 A1 Feb. 14, 2013

(51) Int. Cl.
*B65G 23/44* (2006.01)
*B65G 47/90* (2006.01)

(52) U.S. Cl.
USPC .......................................... 198/814; 198/813

(58) Field of Classification Search
None
See application file for complete search history.

(56) References Cited

U.S. PATENT DOCUMENTS

| 4,925,009 | A | * | 5/1990 | Hill ............................... 198/583 |
| 5,164,777 | A | | 11/1992 | Agarwal et al. |
| 7,648,328 | B2 | * | 1/2010 | Binder et al. .............. 414/797.2 |
| 2009/0074549 | A1 | | 3/2009 | Binder et al. |

FOREIGN PATENT DOCUMENTS

| DE | 102008023762 A1 | 3/2009 |
| EP | 1986941 B1 | 12/2009 |
| WO | 2007093774 A1 | 8/2007 |
| WO | 2009/026925 A1 | 3/2009 |

OTHER PUBLICATIONS

German Search Report Dated Feb. 8, 2011, Applicant MULTIVAC Sepp Haggenmueller GmbH & Co., KG. Application No. 10 2010 023 337.4-22, 3 Pages.
Extended European Search Report Dated Sep. 26, 2011, Applicant Multivac Haggenmueller GmbH & Co. KG, Application No. 11004164.7-1261, 4 Pages.

* cited by examiner

*Primary Examiner* — Kavel Singh
(74) *Attorney, Agent, or Firm* — Husch Blackwell LLP

(57) ABSTRACT

The invention relates to a tensioning device (15) for an endless transport belt (14), whereby the tensioning device (15) comprises two tensioning edges (16) around which the transport belt (14) is deflectable, and at least one spring section (26, 26') integrally formed with the tensioning edges (16) and arranged between the two tensioning edges (16). This tensioning device (15) can be provided with a transport belt (14) and used in an automatic gripper system (1).

21 Claims, 6 Drawing Sheets

TIGHTENER

TECHNICAL FIELD

The invention relates to a tensioning device, which for example can be used for tensioning an endless transport belt in automatic gripper systems.

BACKGROUND

An automatic gripper system with a transport belt follows for example from EP 1 986 941 A1. This gripper system has a rigid plate which is pushed under a soft or sensitive object which is to be transported. In order to avoid deforming the object, a transport belt is placed around the plate. When the plate is pushed under the object, the transport belt moves relative to the plate, but not relative to the object. In this way friction between the object and the transport plate is avoided.

With regard to the transport belt there are two different variants in EP 1 986 941 B1. In one variant the transport belt is pretensioned. Here, however it is necessary that both ends of the transport belt are fastened to different points in the gripper system and that a tensioning device engages one end of the transport belt. With the other variant the transport belt is closed to form an endless transport belt around the gripper plate. With this embodiment however no tensioning device is provided, because there is no free end of the transport belt available with which a tensioning device could engage.

SUMMARY

The object of the present invention is to provide a tensioning device also for an endless transport belt, in particular with regard to use in a gripper system.

The tensioning device according to the invention comprises two tensioning edges around which the transport belt can be deflected, and at least one spring section integrally formed with the tensioning edges and arranged between the two tensioning edges. In this way several advantages are obtained:

In contrast to conventional tensioning devices the tensioning device according to the invention acts not just on one end of the transport belt, but rather via both tensioning edges on two different sections of the transport belt. As a result the transport belt is tensioned more evenly.

The tensioning device is arranged within the endless transport belt so that the tensioning device according to the invention requires a comparatively small installation space.

Due to the tension of the transport belt, sagging and bulging is prevented even with an endless transport belt. Instead a flat transport surface is available.

The tension force exerted by the tensioning device can be so strong that the objects to be transported are carried solely by the tensioned transport belt, so that an additional gripper plate, as in the state of the art, can be omitted.

Due to the integral formation of the tensioning edges with the at least one spring section, the tensioning device can be easily cleaned, so that it can be excellently used also in critical hygienic areas, such as for the transport of foodstuffs.

In order to achieve an especially good distribution of the tension forces not only one but two spring sections can be provided.

Furthermore, inhomogeneous tension forces can be avoided if the existing spring sections are distributed in a direction parallel to the tensioning edges symmetrically over the tensioning device. For example, a first spring section could be provided on a first end of the tensioning edges and a second spring section on an oppositely situated end of the tensioning edges.

In a preferred embodiment variant a spring section is formed omega-shaped in order to be able to apply sufficiently high spring forces over a comparatively short distance.

Alternatively to this, a spring section could be formed, S-shaped, Z-shaped or double S-shaped, whereby the latter corresponds to a shape in which two S-shaped sections abut one another, one mirroring the other.

It is expedient if two mutually contactable overexpansion abutments are provided between the two tensioning edges. In this way the situation is avoided in that the spring sections deform in the plastic region when the load is too strong.

The overexpansion abutments can for example have a spacing of 3 to 12 mm from one another, preferably 4 to 8 mm.

An overexpansion abutment can be joined to the adjacent tensioning edge by a plate-shaped section and/or by stays. The formation using stays has the advantage here in that less material is needed so that the tensioning device is lighter.

The overexpansion abutments can also be provided in the form of mutually engaging fingers.

The tensioning device must fulfill conflicting requirements. Firstly, it must be strong enough to be able to transfer the spring forces on the tensioning edges to the transport belt. Secondly, due to the integral formation of the spring sections with the tensioning edges, the material of the tensioning device must be elastic enough in order to allow suitable spring forces to arise in the spring sections. To fulfill these requirements it is expedient if the modulus of elasticity for the material of the tensioning device lies in the range from 2,500 MPa to 3,200 MPa.

Preferably, the tensioning device is manufactured from a plastic, because plastics are both light and can be easily cleaned and in addition can exhibit a suitable modulus of elasticity. Polyoxymethylene (POM) and/or polyethylene (PE) are particularly suitable as material for the tensioning device. Here, in variants with a melt-flow index of a maximum of 50 grams/10 minutes, POM offers the advantage of approval for contact with foodstuffs, so that the tensioning device formed with it can also be employed in the foodstuffs sector.

If the tensioning edges, the at least one spring section and optionally the overexpansion abutments have a constant material thickness throughout, the tensioning device according to the invention is particularly strong and can be easily manufactured, because it can be manufactured for example from one common plate.

The material thickness can for example range from 2 mm to 5 mm.

In one embodiment variant a bearing element can be plugged onto the tensioning device. This bearing element can act as the rotation and guiding point for the tensioning device and the transport belt provided on it. The plug-on capability enables a bearing element to be provided in a different material than in the remaining region of the tensioning device and facilitates removal of the bearing element for cleaning.

The invention also relates to a gripper system with a transport belt for the accommodation or transport of products, for example, foodstuffs, and with a tensioning device of the type mentioned above. This gripper system has the advantage in offering uniform tensioning of the transport belt without a tensioning device being provided protruding over the transport belt.

The gripper system can also be improved in that a guide element for the tensioning device (for example a guide rod) is held in a mounting with spring tension. In this way the guide element with the tensioning device can be easily removed and replaced whereas at the same time it is securely held when the gripper system is in operation.

The invention also relates to a method for manufacturing a tensioning device for an endless transport belt, whereby predetermined portions are removed from a plate so that the plate contains two tensioning edges, around which the transport belt is deflectable, and at least one spring section integrally formed with the tensioning edges and arranged between the two tensioning edges. The method has the advantage that by using a plate as a workpiece a uniform material thickness is ensured from the start. The removal of the predetermined portions can occur by stamping or by cutting, for example with a laser beam or a water jet. Alternatively, injection moulding of the tensioning device would be a conceivable alternative.

In the following, advantageous embodiments of the invention are explained in more detail with reference to the below drawings.

BRIEF DESCRIPTION OF THE DRAWINGS

In the figures identical components are designated with the same reference numerals throughout.

FIG. 1 illustrates a perspective view of a gripper system 1 according to the invention. It can be used for grasping and transporting products, for example foodstuffs.

Figure 1:
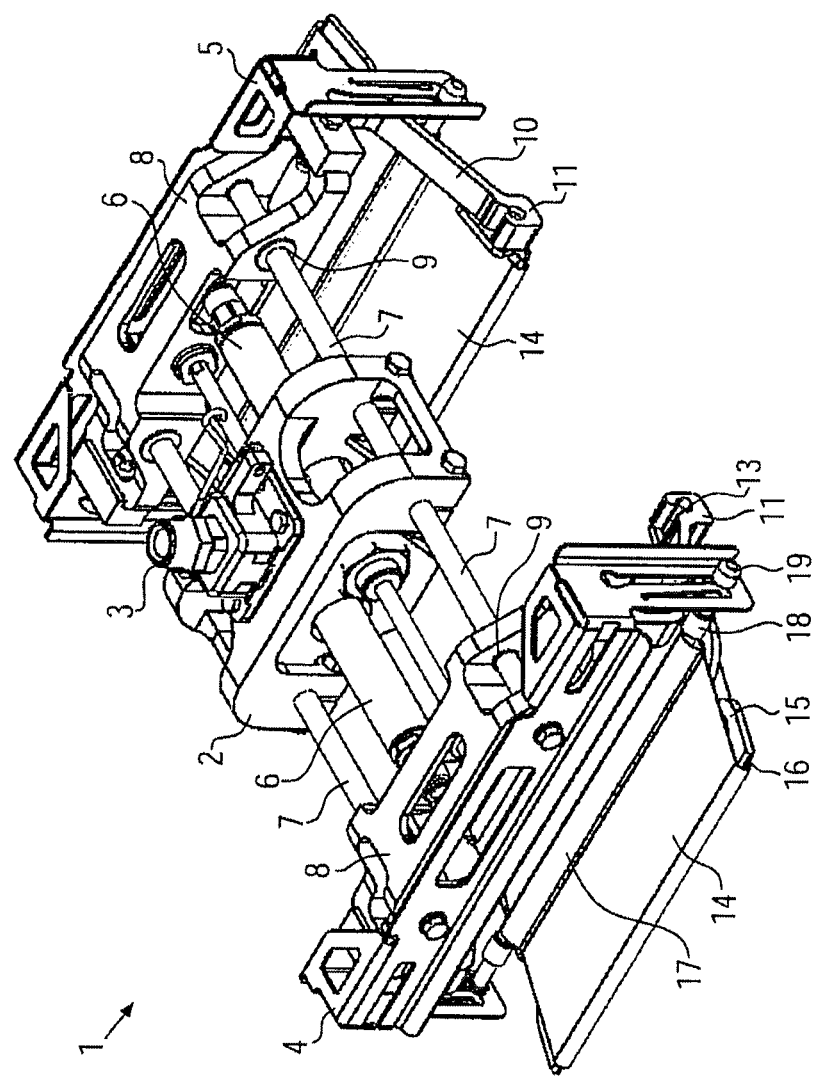
FIG. 1 a perspective view of a gripper system according to the invention.

The gripper system 1 has a central body 2. The supply of electrical power and optionally compressed air for the gripper system 1 occurs via a connection 3 on the upper side of the central body 2. If the gripper system 1 is electrically operated, an electric motor is arranged in the central body 2.

A crossbeam 4, 5 is located on each of two oppositely situated sides of the central body 2. The respective crossbeam 4, 5 is joined to the central body 2 via extension arms 6 and guide rods 7. The guide rods 7 can extend through the central body 2 from one crossbeam 4 to the other crossbeam 5.

In each case a slide 8 can move linearly along the guide rods 7 between the central body 2 and a crossbeam 4, 5. For this purpose the slide 8 has openings 9 through which the guide rods 7 penetrate.

Figure 3:
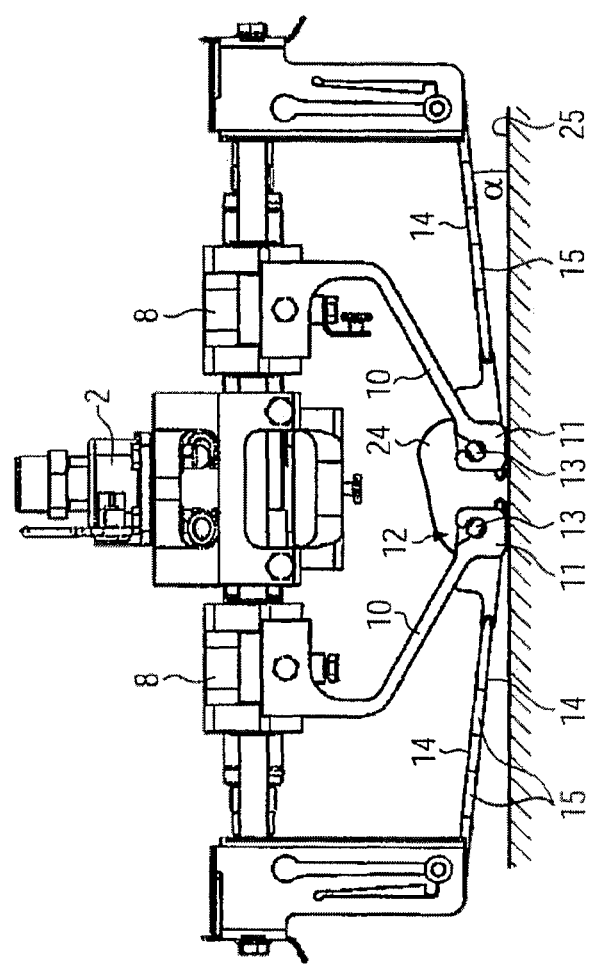

On each of the two face sides of a slide 8 a support arm 10 is provided, the shape of which is more apparent from FIG. 3. The support arm 10 extends from the slide 8 initially in a first section downwards, before a second section of the support arm 10 extends at a slope. At the lower end of each support arm 10 there is a head 11 with a receptacle 12 for a bearing element 13, the function of which is explained below.

The gripper system 1 has two endless transport belts 14 in a washable fabric conforming to FDA requirements, especially a filter fabric. The transport belts 14 can be moved towards and away from one another by the movement of the slides 8 in order to push under an object to be transported or to release this object again. Each transport belt 14 extends around a generally plate-shaped tensioning device 15 according to the invention. The tensioning device 15 has a front and a rear tensioning edge 16 around which the transport belt 14 is deflected. The two tensioning edges 16 extend parallel to one another and perpendicular to the direction of movement of the slides 8 along the guide rods 7. The tensioning edges 16 can be rounded off, for example half-round, to reduce the abrasion of the transport belt 14 on the tensioning edges 16.

The transport belt 14 is joined to a pocket 17 which extends over the complete width of the transport belt 14 and is open at both ends. A positioning element 18, formed as a positioning bar, extends through the pocket 17. With its widened ends 19 the positioning element 18 extends through a vertically aligned mounting 20, which is provided on each of the face sides of the two ends of a crossbeam 4, 5. The mounting 20 has a mounting slot 21, the upper end 22 of which is enlarged. In particular, the upper end 22 of the mounting slot 21 is so large that the enlarged end 19 of the positioning element 18 can move through this upper end 22, whereas it is otherwise wider than the remaining region of the mounting slot 21 which is located below the upper end 22.

A spring arm 23, which extends into the mounting slot, is formed integrally with the mounting 20 which is, for example, formed in stainless steel. This spring arm 23 is deflected when the positioning element 18 is inserted into the mounting slot 21. Through contact pressure of the positioning element 18 on a wall of the mounting slot 21, in the operation of the gripper system 1, the spring arm 23 ensures secure positioning of the positioning element 18, which for its part holds the surrounding pocket 17 of the transport belt 14 at a defined position between the two mountings 20.

Figure 2:
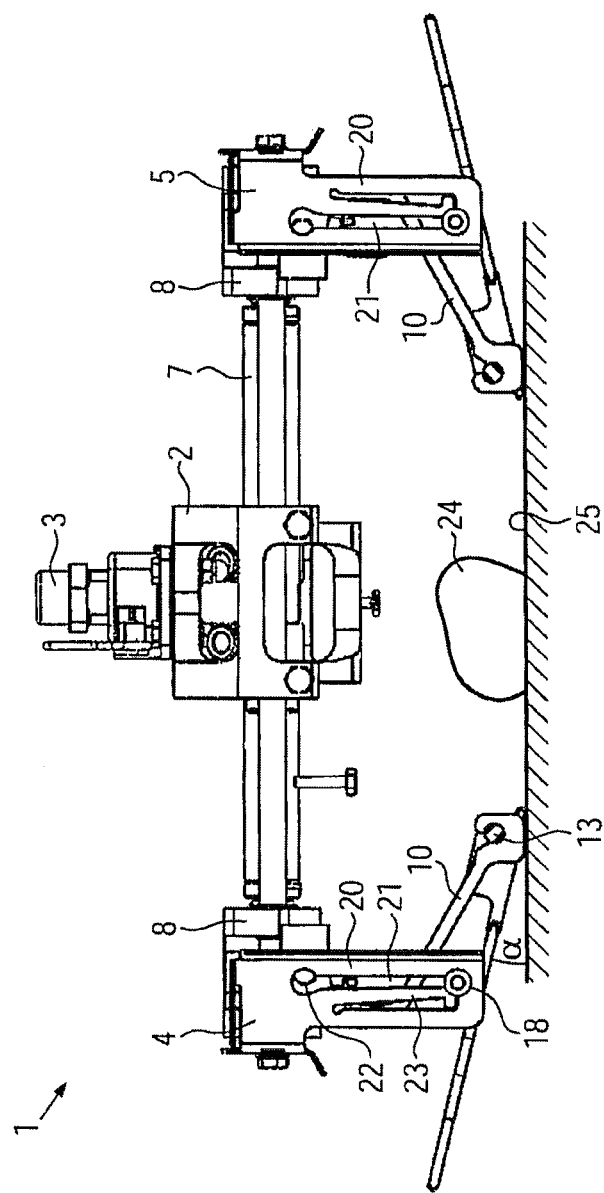
FIG. 2 a side view of the gripper system according to the invention in the open state, FIG. 3 a side view of the gripper system with gripper arms approaching one another, FIG. 4 a first embodiment of a tensioning device according to the invention, FIG. 5 a second embodiment of a tensioning device according to the invention and FIG. 6 a tensioning device according to the invention with a transport belt.

FIG. 2 illustrates the gripper system 1 in a position in which the two slides 8 have been moved along the guide rods 7 into their position most remote from the central body 2. The gripper system is thus open and it is ready to take up an object 24 to be transported which is located on a storage surface 25. The height of the positioning elements 18 compared to the storage surface 25 is predetermined by the gripper system 1, in particular by the length of the mounting slot 21 in the mounting 20. The bearing element 13 is situated at a slightly lower height over the storage surface 25 than the positioning element 18. In the open position of the gripper system 1 illustrated in FIG. 2 the bearing elements 13 take up the minimum horizontal distance with respect to the positioning elements 18. Due to these geometrical conditions the angle α between the transport belt 14 and the storage surface 25 is at a maximum of about 15 degrees in this position.

FIG. 3 illustrates the gripper system 1 in a position in which the slides 8 have been moved up to the central body 2. With this movement the tensioning devices 15 and the transport belts 14 are pushed under the object 24 to be moved. This object 24 is now borne by the carrying run of the respective transport belt 14. During the movement of the slides 8 the transport belt 14 moves around the respective tensioning device 15, because the pocket 17 joined to it is held fixed to the positioning element 18. In this way the relative movement and thus the friction between the transport belt 14 and the object 24 are minimised. In the closed position of the gripper system 1 illustrated in FIG. 3 the bearing elements 13 have a larger spacing in the horizontal direction from the positioning elements 18 than in the open position. Consequently, the angle α between the transport belt 14 and the storage surface 25 is smaller than the one in the open position illustrated in FIG. 2. In the closed position of the gripper system 1 the angle α is only about 6 degrees.

Figure 4:
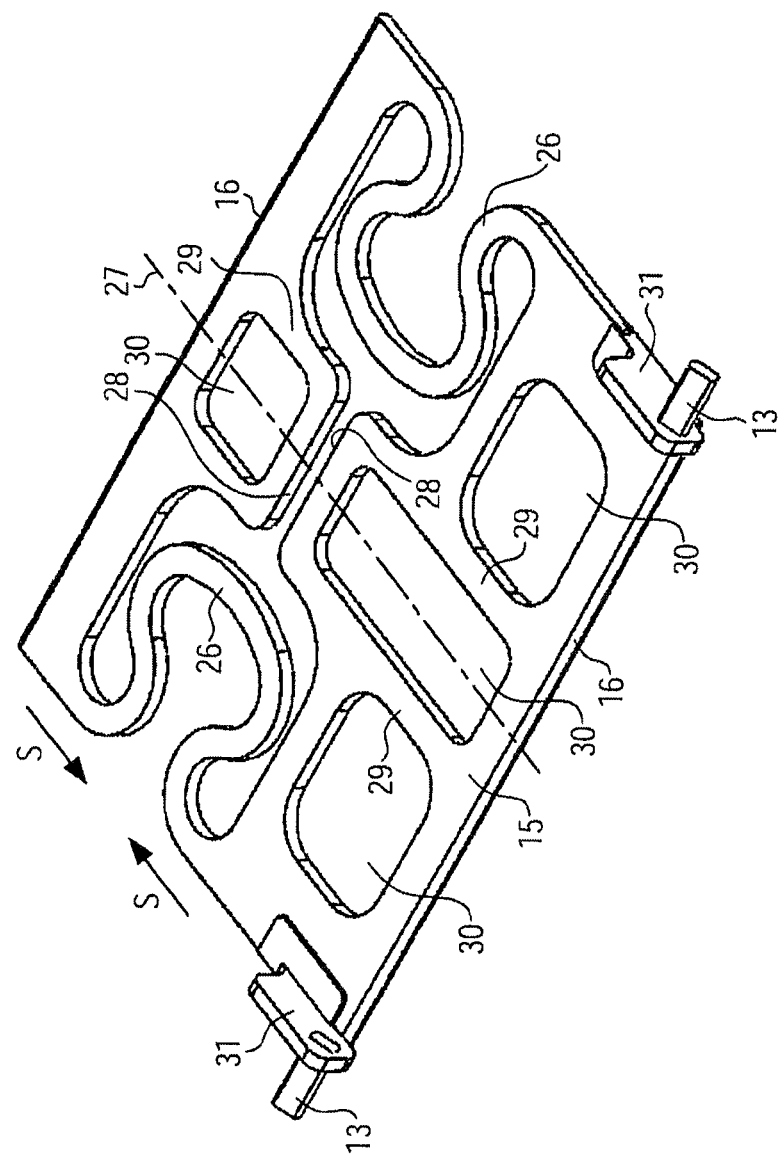

FIG. 4 shows a first embodiment of a tensioning device 15 around which the transport belt 14 is placed. The tensioning device 15 is produced by removing certain sections from a plate-shaped material, for example in POM. Consequently, it has a constant thickness overall of for example three millimeters.

On both longitudinal sides of the tensioning device 15 there are two mutually parallel tensioning edges 16 around which the transport belt 14 is deflected. The tensioning edges 16 can in particular be rounded off in order to reduce the abrasion of the transport belt. Between the two tensioning edges 16 there are two spring sections 26, which are integrally formed with the remaining regions of the tensioning device 15. The spring sections are each formed approximately omega-shaped. The complete tensioning device 15 is formed mirrored about a central axis 27. Consequently, the two spring sections 26 are symmetrically arranged in a direction parallel to the tensioning edges 16 and thus perpendicular to the central axis 27.

In FIG. 4 the tensioning device 15 is in its released position. In a tensioning direction S, i.e. in a direction along the central axis 27, the two tensioning edges 16 can however be moved towards one another. In doing this the spring sections 26 are compressed so that they exert a spring force on the two tensioning edges 16 directed outwards. This spring force is proportional to the displacement of the two tensioning edges 16 with respect to one another.

Centrally, between the two spring sections 26 there are two mutually contactable overexpansion abutments 28. These overexpansion abutments 28 have a spacing one to the other of about 3 to 12 mm. When this distance has been bridged on moving the two tensioning edges 16 towards one another, the two overexpansion abutments 28 come into contact with one another so that they prevent further movement of the tensioning edges 16 towards one another. In this way it is ensured that the spring sections 26 are only deformed in their elastic range, but not in the plastic range.

Each of the two overexpansion abutments 28 is therefore assigned to one of the two tensioning edges 16. The overexpansion abutments 28 are joined to the two tensioning edges 16 via ridges 29, between which the openings 30 are located. These openings 30 could however also be omitted so that the overexpansion abutments 28 would be joined by plate-shaped sections to the respective tensioning edges 16.

A bearing element 13 is plugged onto each of the two short sides of the tensioning device 15. For this purpose the bearing element 13 is joined to a retainer 31 which can be inserted into a suitable opening in the tensioning device 15. The bearing element 13 can be formed integrally with the retainer 31, for example in a metal. The bearing element 13 has itself a somewhat rectangular cross-section with rounded-off longitudinal sides. The rectangular cross-section enables the bearing element 13 to be inserted into the receptacle 12 in the head 11 of the support arm 10 from above—however only in a position in which the rectangular cross-section of the bearing element 13 is aligned in the longitudinal direction of the receptacle 12. Then the tensioning device 15 with the bearing element 13 joined to it is rotated into the position illustrated in FIGS. 2 and 3. In this position the bearing element 13 can still namely rotate in the lower region of the receptacle 12 when the slide 8 moves along the guide rods 7. The bearing element 13 can however no longer be removed upwards from the receptacle 12.

Figure 5:
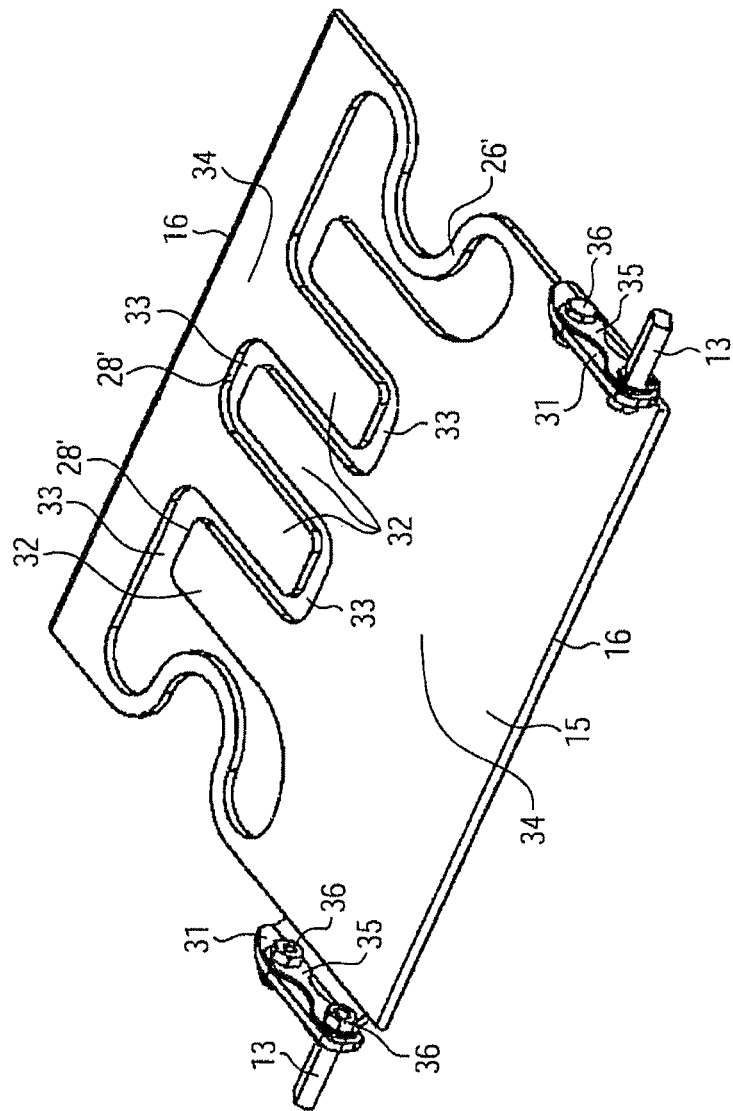

FIG. 5 illustrates another embodiment of a tensioning device 15. In this embodiment the spring sections 26' are no longer omega-shaped, but rather formed as a double S, whereby the two S-shaped sections of the spring sections 26' are located adjacently and mirrored.

A further difference to the embodiment according to FIG. 4 is that the two overexpansion abutments 28' each have several fingers 32, which engage appropriate recesses 32 in the oppositely situated section of the tensioning device 15. One overexpansion abutment 28' has two fingers 32, whereas the other overexpansion abutment 28' has three fingers 33 and two recesses 33 between them for accommodating the fingers 32 of the other overexpansion abutment 28'. In this embodiment the overexpansion abutments 28' are joined by plate-shaped sections 34 to the respectively assigned tensioning edges 16, because the openings 30 are omitted. Between the fingers 32 and the oppositely situated bottom of the assigned recess 33 the distance is between 3 and 12 mm, for example between 4 and 8 mm. Once this distance has been bridged, the two tensioning edges 16 can no longer be moved towards one another.

A further difference relative to the embodiment according to FIG. 4 is that in the embodiment of the tensioning device 15 according to FIG. 5 the retainers 31 are integrally formed as side flanges with the remaining region of the tensioning device 15. The bearing elements 13 are fastened to the mounting flanges 31 by mounting plates 35 and rivets or screws 36.

Figure 6:
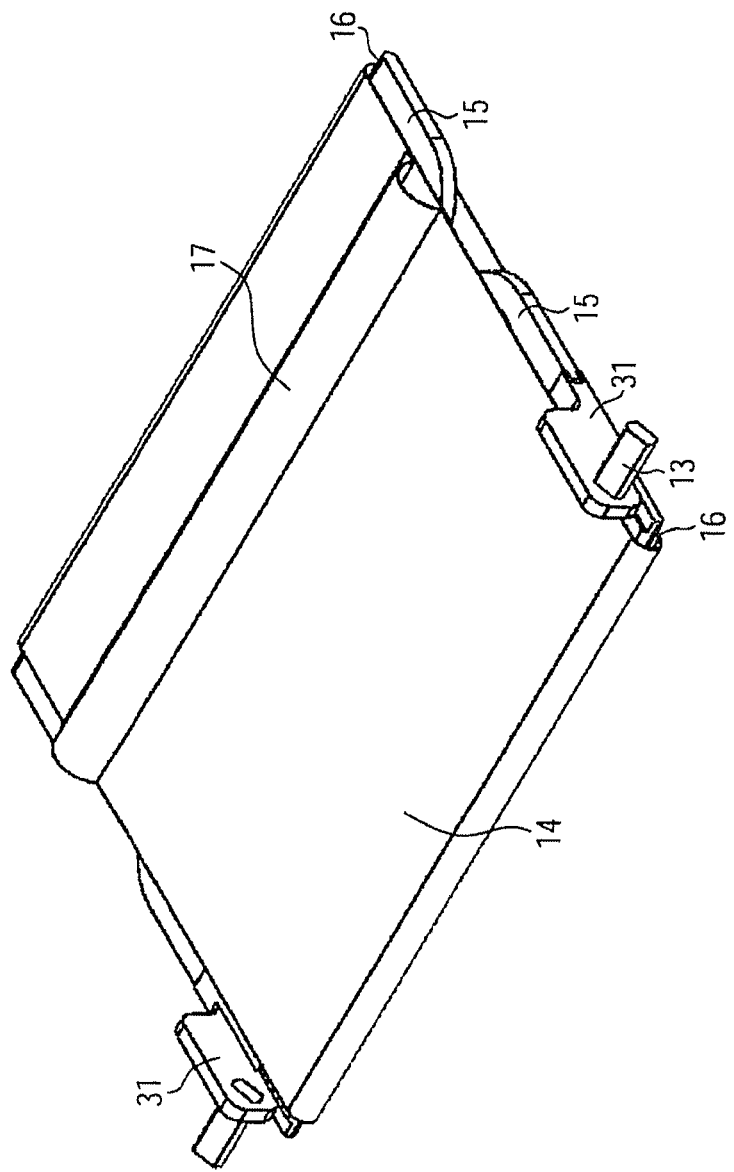

FIG. 6 illustrates the tensioning device 15 according to the invention with an endless transport belt 14 placed around the tensioning edges 16. On the transport belt 14 a tubular pocket 17 is provided through which the positioning element 18 can be extended. The length of the transport belt 14 corresponds approximately to double the distance between the two tensioning edges 16, so that the transport belt 14 is put under a slight tension by the tensioning device 15. In this way a smooth, flat surface of the transport belt 14 is achieved. The width of the transport belt 14 is slightly less than the distance between the two mountings 31 for the bearing elements 13, so that no abrasion of the transport belt 14 occurs on the retainers 31.

The tensioning device 15 according to the invention can be manufactured in that suitable portions are removed from, for example, a rectangular, plate-shaped workpiece in order to obtain the shapes of the tensioning device 15 illustrated in FIG. 4 or 5. The removal of the portions can take place using a stamping device or through suitable cutting, for example by means of a laser or water jet.

Starting from the embodiments illustrated, the gripper system 1 according to the invention and the tensioning device 15 according to the invention can be varied in many respects. For example, the differences of the two tensioning devices 15 illustrated in FIGS. 4 and 5 can also be realised independently of one another. The spring sections 26 can also have a different shape, for example an S-shape or Z-shape. With overexpansion abutments 28' with several fingers 32 more or fewer fingers than illustrated in FIG. 5 can also be provided.

The invention claimed is:

1. A tensioning device for an endless transport belt, wherein the tensioning device comprising two tensioning edges and at least one spring section integrally formed with the tensioning edges and at least partially located between the two tensioning edges, wherein the belt circumscribes the two tensioning edges and the at least one spring section, the belt being deflectable around the two tensioning edges.

2. The tensioning device as claimed in claim 1, wherein the at least one spring section comprises two spring sections.

3. The tensioning device as claimed in claim 2, wherein the two spring sections are symmetrically distributed in a direction parallel to the tensioning edges.

4. The tensioning device as claimed in claim 1, wherein the spring section is omega-shaped.

5. The tensioning device as claimed in claim 1, wherein the spring section is S-shaped, double S-shaped or Z-shaped.

6. The tensioning device as claimed in claim 1, wherein two overexpansion abutments contactable with each other are provided between the two tensioning edges.

7. The tensioning device as claimed in claim 6, wherein the overexpansion abutments have a distance of 3 to 12 mm from each other.

8. The tensioning device as claimed in claim 6, wherein at least one of the overexpansion abutments is connected by a plate-shaped section and/or by stays with the adjoining tensioning edge.

9. The tensioning device as claimed in claim 1, wherein the tensioning device is made of a plastic material.

10. The tensioning device as claimed in claim 6, wherein the tensioning edges, the at least one spring section and optionally the overexpansion abutments have a continuously constant material thickness.

11. The tensioning device as claimed in claim 10, wherein the material thickness is 2 mm to 5 mm.

12. The tensioning device as claimed in claim 1, wherein a bearing element can be plugged onto the tensioning device.

13. A gripper system comprising a transport belt for collecting or transporting products, and the tensioning device as claimed in claim 1.

14. A method for manufacturing a tensioning device for an endless transport belt, wherein predetermined portions are removed from a plate so that the plate contains two tensioning edges around which the transport belt is deflectable, and at least one spring section is integrally formed with the tensioning edges and arranged between the two tensioning edges.

15. A tensioning device for a transport belt, the tensioning device comprising: a plate comprising a front tensioning edge, a rear tensioning edge, spaced from, and generally parallel to, the front tensioning edge, a first side edge extending between and connecting the front and rear edges, and a second side edge, spaced apart and generally parallel to the first side edge, extending between and connecting, the front and rear edges, the transport belt being deflectable around at least one of the tensioning edges, and at least one of the side edges having at least one spring section integrally formed with the plate and arranged between the two tensioning edges.

16. The tensioning device as claimed in claim 15, wherein the at least one spring section comprises two spring sections.

17. The tensioning device as claimed in claim 16, wherein the spring section is omega-shaped.

18. The tensioning device as claimed in claim 1, wherein the tensioning device is made of a plastic material.

19. The tensioning device as claimed in claim 16, wherein the spring sections extends inwardly towards each other, away from a respective one of the side edges.

20. The tensioning device as claimed in claim 19, wherein each spring section includes a neck having spaced apart neck portions and a base having spaced apart base portions, the neck portions being closer to each other than the base portions.

21. The tensioning device as claimed in claim 1, wherein the tensioning edges and the spring section are substantially coplanar.

\* \* \* \* \*